United States Patent [19]
Gschwendtner et al.

[11] Patent Number: 5,400,824
[45] Date of Patent: Mar. 28, 1995

[54] MICROVALVE

[75] Inventors: Horst Gschwendtner, Esslingen; Jiri Marek, Reutlingen; Michael Mettner, Ludwigsburg; Gerhard Stokmaier, Markgröningen; Thomas Grauer, Stuttgart, all of Germany

[73] Assignee: Robert Bosch GmbH, Stuttgart, Germany

[21] Appl. No.: 174,753

[22] Filed: Dec. 29, 1993

Related U.S. Application Data

[63] Continuation of Ser. No. 924,015, Sep. 21, 1992, abandoned.

[30] Foreign Application Priority Data

Jan. 21, 1991 [DE] Germany .......................... 4101575.4

[51] Int. Cl.$^6$ .......................................... F16K 31/02
[52] U.S. Cl. .................... 137/625.28; 137/82; 137/625.33; 251/129.01; 251/129.06
[58] Field of Search ................ 137/82, 625.28, 625.33; 251/129.01, 129.06

[56] References Cited

U.S. PATENT DOCUMENTS

| | | | |
|---|---|---|---|
| 4,581,624 | 4/1986 | O'Connor | 357/26 |
| 4,825,894 | 5/1989 | Cummins | 137/82 |
| 5,054,522 | 10/1991 | Kowanz et al. | 137/625.33 |
| 5,065,978 | 11/1991 | Albarda et al. | 251/129.06 |
| 5,069,251 | 12/1991 | Dyer et al. | 137/625.25 |
| 5,178,190 | 1/1993 | Mettner | 137/625.65 |

FOREIGN PATENT DOCUMENTS

| | | |
|---|---|---|
| 0339528 | 11/1989 | European Pat. Off. . |
| 3621331 | 1/1988 | Germany . |
| 4003619 | 8/1991 | Germany . |
| WO90-06587 | 6/1990 | WIPO . |

*Primary Examiner*—Gerald A. Michalsky
*Attorney, Agent, or Firm*—Frishauf, Holtz, Goodman & Woodward

[57] ABSTRACT

A microminiature valve in multi-layered structure for switching or controlling fluid flows is proposed, having an inlet and a closing element. The inlet is embodied in a first layer in the form of at least one through-opening. The closing element is structured out of a second layer which is applied on the first layer. This second layer has at least one further through-opening in the area of the closing element. The closing element is displaceable by actuation means, in particular electrical ones, essentially parallel to the first layer and the second layer, so that in at least one first position of the closing element the at least one through-opening of the inlet, together with the at least one further through-opening in the second layer, forms at least one flow-through opening. The cross section of the at least one flow-through opening can be varied by actuating the closing element.

23 Claims, 3 Drawing Sheets

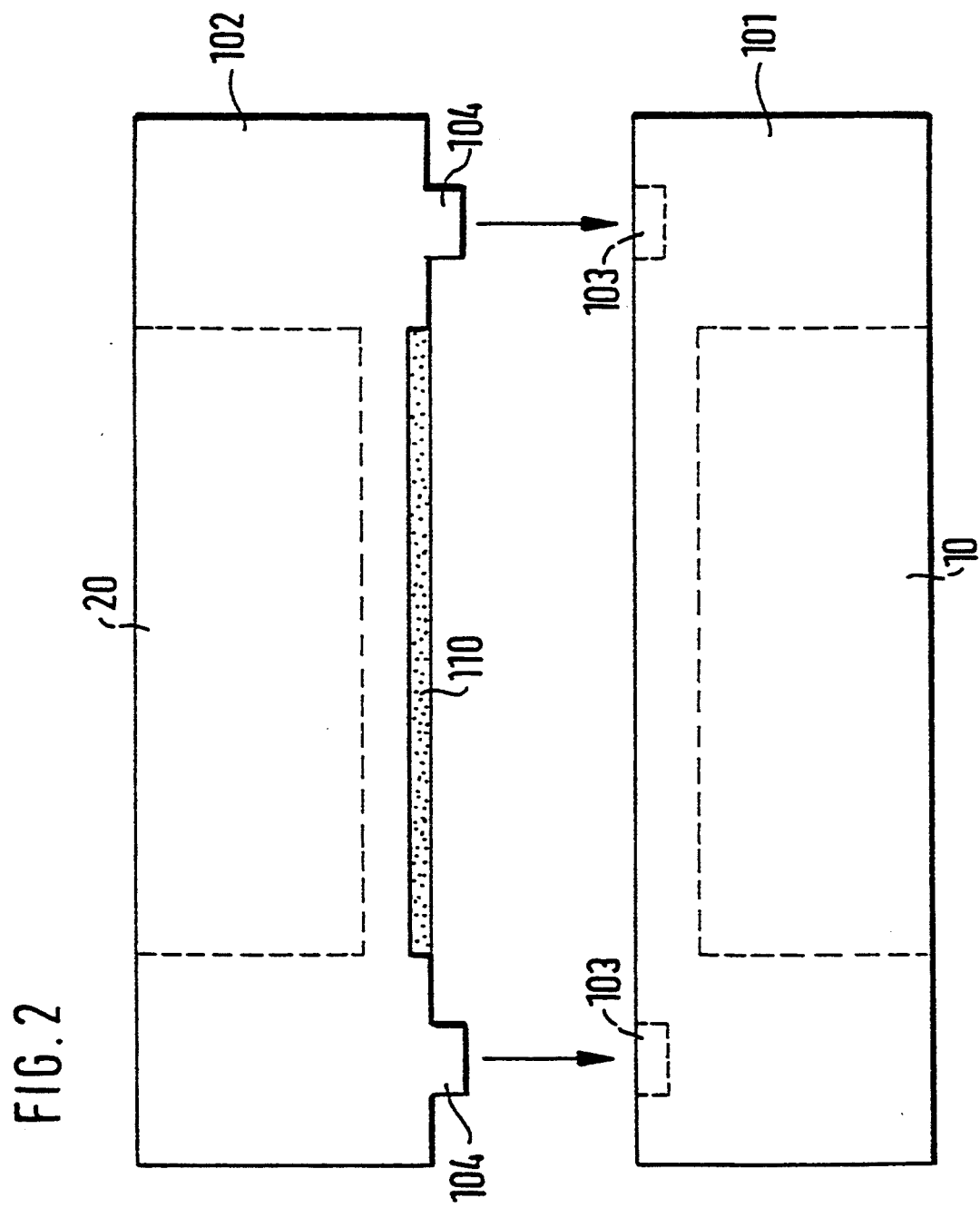

MICROVALVE

This application is a continuation of application Ser. No. 07/924,015, filed Sep. 21, 1992, now abandoned.

FIELD OF THE INVENTION

The invention relates to a microminiature valve.

BACKGROUND

A microminiature valve is already known from O'-Connor/Allied British Patent Disclosure GB 21 55 152 A, and corresponding U.S. Pat. No. 4,581,624 which is produced in accordance with the multi-layered structure techniques known from semiconductor technology. This micro-mechanical valve has essentially three layers, in the substrate of silicon of which an inlet and an outlet as well as a valve seat are embodied. An intermediate layer adjoins the substrate and an outer cover layer adjoins the former, these layers forming a chamber generating the pressure medium connection between the two connections. With this microminiature valve the cover layer is also embodied as a diaphragm into which a closing member associated with the valve seat has also been integrated. In addition, an electrostatic actuation device is disposed on the diaphragm, by means of which the valve can be opened in that the closing member is displaced perpendicularly to the planes of the layers while deforming the diaphragm. Closing of the valve is accomplished by means of the restoring force of the diaphragm, by the effect of which the closing member again comes to rest on the valve seat when the actuation device is shut off. The electrostatic actuation device therefore must overcome the force of the resilient diaphragm in addition to the pressure of the fluid present at the inlet. The non-pressure-compensated construction of the microminiature valve requires extensive actuation devices because relatively large actuating forces are required.

ADVANTAGES OF THE INVENTION

The microminiature valve of the invention has the advantage that the movement of the closing element here takes place in a lateral direction instead of perpendicularly to the planes of the layers of the multi-layered structure. The closing element cannot be displaced in the flow-through direction of the fluid, which is conducted through the valve perpendicularly to the planes of the layers. The displacement of the closing element in the lateral direction is only slightly hampered by the fluid flowing through. A further essential advantage of the microminiature valve of the invention is that it is possible to expose relatively large flow cross sections with relatively small adjustment movements and that in this way large-volume fluidic flows can be controlled. It is also advantageous that the structure of the microminiature valve can be produced by means of standard processes of micro-mechanics, which permits cost-efficient mass production. The microminiature valve can be advantageously employed in connection with gasoline fuel injection, for example.

The design of the inlet as a first grid structure and the embodiment of the closing element as a second grid structure suspended on resilient beams has been shown to be particularly advantageous, because the flow cross section of a fluid can be controlled particularly simply by a lateral parallelogram-like displacement of the closing element. Depending on the position of the two grid structures in relation to each other, a more or less large flow-through opening is exposed. It is advantageous if the first grid structure constituting the inlet and the second grid structure constituting the closing element are of the same kind, i.e. have the same hole size. In order to limit the leakage flow in the closed position, it is advantageous to select the cover of the grid structures positively, so that in the closed position the grid beams of the closing element completely cover the holes of the inlet.

With an appropriate embodiment of the inlet a closing element in the shape of a beam is advantageous, where the beam is pivotable around its base point which is connected with a pedestal. To assist this pivoting movement it is advantageous to reduce the width of the beam in the area of its base. In addition, lamellas can extend away from the beam on one or two sides. The beam and/or the lamellas advantageously have such a size that the beam and/or the lamellas cover the through-openings of the inlet in at least one position. In order to achieve as tight as possible a closure of the valves, it is advantageous that means are provided for applying voltage between portions of the first layer and portions of the second layer of the microminiature valve, so that the closing element can be electrostatically pressed against the inlet.

In a further advantageous embodiment of the microminiature valve, nozzle-like edgings are structured into the second layer in addition to the closing element in the shape of a beam, which are disposed in the area of the through-openings of the inlet laterally next to the beam and have a nozzle opening facing the beam. In this embodiment the fluid flows through the inlet into the nozzle-like edgings in the second layer and is passed on through the nozzle openings. Depending on the position of the beam, the degree of opening of the nozzle openings can be varied, by means of which the adjustment of the flow-through amount is possible. With this embodiment a top cover on the second layer is required.

Actuation of the closing element can advantageously be provided piezo-electrically. This can be achieved in an advantageous manner by means of triggerable piezo elements which are connected via lever arms with the closing element, so that a change in extension of a piezo element causes a displacement of the closing element. Actuation of the closing element can also advantageously take place by means of an electrostatic finger drive. For this purpose at least one first comb-shaped lamella structure starting at the closing element is embodied in the second layer. A second comb-shaped lamella structure, also embodied in the second layer, is disposed in such a way that the lamellas of the first and the second lamella structures are interspersed. Application of a voltage between the two lamella structures represents a simple opportunity for actuating the closing element. In order to achieve actuating forces as large as possible, it is advantageous to embody the lamella structures as thick as the entire thickness of the second layer.

A possible production method for the microminiature valve of the invention are the process steps known by the term "LIGA" an acronym for LIthography/GAlvanoforming. In a particularly advantageous manner the microminiature valve of the invention can be made from monocrystalline silicon wafers with a preferably (100)-crystalline orientation or (110)-crystalline orientation by means of anisotropic, wet-chemical etching or electro-chemical dry etching, because these techniques are known from micro-mechanics and are easily handled. The multi-layer structure of the microminiature valve can advantageously take place by means of bonding a plurality of wafers on top of each other via an auxiliary layer, preferably a silicon oxide layer. A particular advantage when using the auxiliary layer lies in that the gap between the first and second layers in the area of the closing element, required for the movement of the closing element, can be very simply created by the removal of the auxiliary layer. The ability to function of the microminiature valve of the invention substantially depends on the exact alignment of the layers in relation to each other. A particularly advantageous possibility for realizing the alignment of two silicon wafers as the first and second layer of the microminiature valve consists in cutting recesses and pedestal-like raisings into the facing surfaces of the silicon wafers at complementary places. The recesses as well as the raisings have a fixed geometric relation to the flow-through openings of the inlet and the closing element. In the course of bonding the wafers to each other, the recesses and raisings are used as mechanical alignment aids by means of which it is assured that the slits of the inlet and the second layer in the area of the closing elements come to rest on top of each other in an aligned manner. The recesses as well as the raisings can be created by an etching process by etching-in cuts in the case of the recesses and by removing the surrounding silicon in case of the raisings.

To attain a tight closing of the valve or to limit the leakage flow, it is advantageous to use a silicon wafer as the second layer, the crystalline orientation of which differs from the (110)-orientation by a slight loss angle, and to produce it by anisotropic wet-chemical etching. The resilient beams being formed in the course of this, by means of which the closing element is connected with the second layer, have a main axis of inertia which differs slightly from the orientation of the surfaces of the wafer, so that the closing element is not only laterally displaced, but also in a direction perpendicular to the wafer surfaces, when a force is exerted parallel to the wafer surfaces. It is achieved by means of this that, when the closing element is actuated, the gap between the first and second layers required for the movement of the closing elements is also compensated for.

DRAWINGS

Exemplary embodiments are illustrated in the drawings and will be explained in detail in the description which follows.

FIG. 1 shows sections of a micro-mechanical horizontal slide valve in a layered embodiment, FIG. 2 a schematic cross section of the aligned structure of a microminiature valve, FIG. 3 the closing element of the micro-mechanical rotary slide valve and FIG. 4 the closing element of a further micromechanical rotary slide valve.

DETAILED DESCRIPTION

Figure 1:
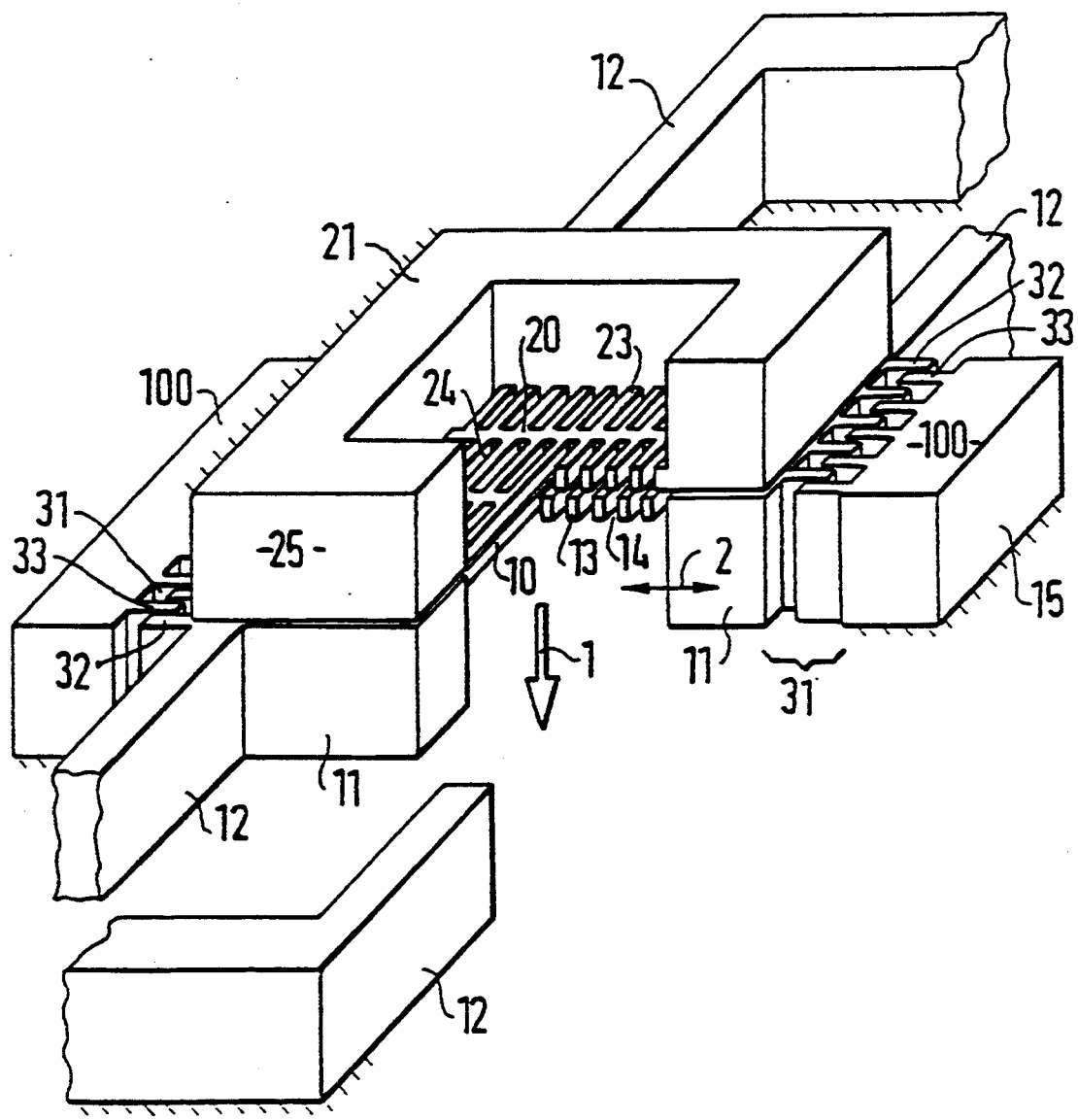

Sections of a microminiature valve constructed in layers and having an inlet and a closing element are shown in FIG. 1. The flow-through direction of the fluid flow to be switched or controlled is indicated by the arrow 1. The arrow 2 symbolizes the direction of displacement of the closing element. The structure of the microminiature valve substantially has a first layer 25 and a second layer 15 placed thereon. A fixed grid structure 20 with grid beams 23 forming holes 24 is structured in a frame 21 in the first layer 25. A second grid structure 10, also having grid beams 13 and holes 14, is formed analogously to the first grid structure 20 in the second layer 15. The frame 11 of the second grid structure 10 is connected with the second layer 15 via resilient beams 12. The resilient beams 12 are embodied considerably narrower than tall, so that bending in a lateral direction 2 takes place preferably to bending perpendicularly to the planes of the layers. There is a fine gap between the first layer 25 and the second layer 15 in the area of the grid structures 10, 20, the frames 11, 21 and the resilient beams 12. By means of this it is possible to displace the second grid structure 10, which forms the closing element, in the frame 11 laterally, i.e. parallel to the layers 15 and 25 forming the microminiature valve, because of which the size of the flow-through opening formed by the overlapping holes 14, 24 of the first and second grid structures 10, 20 can be changed. The first grid structure 20 is used as inlet, the second grid structure 10 as closing element and outlet of the microminiature valve. The inlet of the valve is separated from the outlet of the valve. In the exemplary embodiment shown in FIG. 1, actuation of the closing element is effected via interspersed comb-shaped lamella structures 32 and 33, between which a voltage can be applied. One of the interspersed comb-shaped lamella structures 32 extends from the frame 11 of the grid structure 10 forming the closing element. The other comb-shaped lamella structure 33 extends from the fixed part of the second layer 15. When applying a voltage between the lamella structures 32 and 33, a force acts on the closing element and causes a displacement parallel to the second layer 15 while bending the resilient beams 12.

The embodiment of the first grid structure 20 constituting the inlet of the valve and the embodiment of the second grid structure 10 constituting the closing element of the microminiature valve can be matched to the function of the microminiature valve as a switching or a control valve. To keep leakage flow from the microminiature valve as small as possible, it is practical to dispose the grid structures 10 and 20 in the frames 11 and 21 in such a way, that the grid beams 13 and 23 are oriented parallel or parallel and perpendicular to the displacement direction of the closing element indicated by the arrow 2. If the first grid structure 10 and the second grid structure 20 have the same size holes, the possibility for varying the flow-through opening of the microminiature valve is greatest. If the microminiature valve is intended to be closable as tightly as possible, the width of the grid beams 13 of the closing element is possibly chosen to be greater than the holes 24 of the inlet. However, other grid-like structures and their combinations which form the inlet and the closing element are also within the scope of the invention.

The comb-shaped, interspersed lamella structures 32 and 33 constituting the electrostatic finger drive 31 can either be disposed on the closing element itself or, as in this example, on the frame 11 of the second grid structure 10, or on the resilient beams 12 which form the suspension device. It is particularly advantageous to embody the comb-shaped lamella structures 32, 33 with the full layer thickness of the second layer 15, because it is possible to generate greater forces with a greater structural height of the lamella structures, with equal lateral dimensions of the lamella structures and equal electrical fields.

The microminiature valve shown in FIG. 1 can be advantageously made of monocrystalline silicon wafers with preferably (100)-crystalline orientation or (110)-crystalline orientation. Structures of great depth and with sidewalls perpendicularly to the wafer surface can be created easily in wafers with (110)-crystalline orientation by anisotropic etching, which is particularly advantageous in connection with the microminiature valves here described. Silicon wafers with (100)-crystalline orientation can be made by anisotropic etching or electro-chemical dry etching, where only small structural depths are achieved with the latter. However, the LIGA-technology or similar shaping techniques are applicable as manufacturing methods for the microminiature valves herein described, where materials other than silicon can be used. The layered structure and the embodiment of through-holes perpendicularly to the layer surfaces is particularly suited to the application of shaping techniques in manufacture.

The use of (110)-silicon wafers and their structuring by anisotropic etching is particularly suitable for producing lamella structures of great structural height, such as are used in the electrostatic finger drive.

The realization of the layered structure of the microminiature valve shown in FIG. 1 requires very exact alignment in relation to each of the two wafers forming the two layers, in order to prevent undesirable overlapping of the grid structures 10, 20 and too large leakage rates. As shown in FIG. 2, it is possible to etch recesses 103 as alignment aids at defined places in a first wafer 101. These recesses have fixed geometric relation to the through-openings forming the inlet or structured in the area of the closing element. These areas have been designated in FIG. 2 with 10 and 20, corresponding to FIG. 1. The second wafer 102 of the layer structure has raisings 104 at places complementary to the recesses 103 in the wafer 101. These raisings 104 are also produced by an etching process in which the surrounding silicon is removed. The through-openings formed in the second wafer 102 also have a fixed geometric relationship to the raisings 104. During bonding of the wafers 101 and 102, the recesses 103 and raisings 104 are used as mechanical aligning aids. In this way it is assured that the through-openings of the inlet and in the area of the closing elements come to rest above each other exactly aligned. Besides the variant shown in FIG. 1 it is also possible to cut pedestal-like raisings 104 and recesses 103 into one wafer, and in the other wafer complementary recesses 103 and pedestal-like raisings 104. The recesses 103 and pedestal-like raisings 104 are disposed on non-movable parts of the microminiature valve, for example in the areas identified with 100 in FIG. 1. The movability of the closing element is assured by means of this. A silicon oxide layer is indicated by 110 and disposed with 110 in the areas of the grid structures 10 or 20. This oxide layer is used as an auxiliary layer for the mutual bonding of the wafers 101 and 102. By removal of the auxiliary layer 110 in the areas of the closing element and the resilient beams following mutual bonding of the wafers 101 and 102, a fine gap is created between the two layers formed by the wafers 101, 102, which is necessary for the displacement of the closing element parallel to the layers.

Because of the gap between the first layer 25 and the second layer 15, tight closing of the microminiature valve therefore can only be attained by a gap compensation, even in a grid position in which the holes 14 and 25 are completely overlapped by the grid beams 13 and 23. One possibility is constituted by an electrostatic gap compensation, for which a voltage must be applied between the first layer 25 and the second layer 15, so that the two grid structures 10 and 20 are attracted. However, gap compensation is also possible when the second layer in which the closing element is embodied is formed by a silicon wafer, the (110)-crystalline orientation of which has a slight loss angle in respect to the (110)-crystalline orientation. During the anisotropic etching of the grid structure 10, the frame 11 and the resilient beams 12, resilient beams 12 are then created, which have a main axis of inertia the orientation of which slightly differs from the orientation of the surfaces of the silicon wafer forming the second layer 15. If, for example, a force parallel to the wafer surface is exerted on the closing element via the electrostatic finger drive, the special embodiment of the resilient beams 12 also always leads to a minimal displacement perpendicularly to the wafer surfaces which, however, is sufficient to compensate for the gap between the first layer 25 and the second layer 15.

Figure 3:
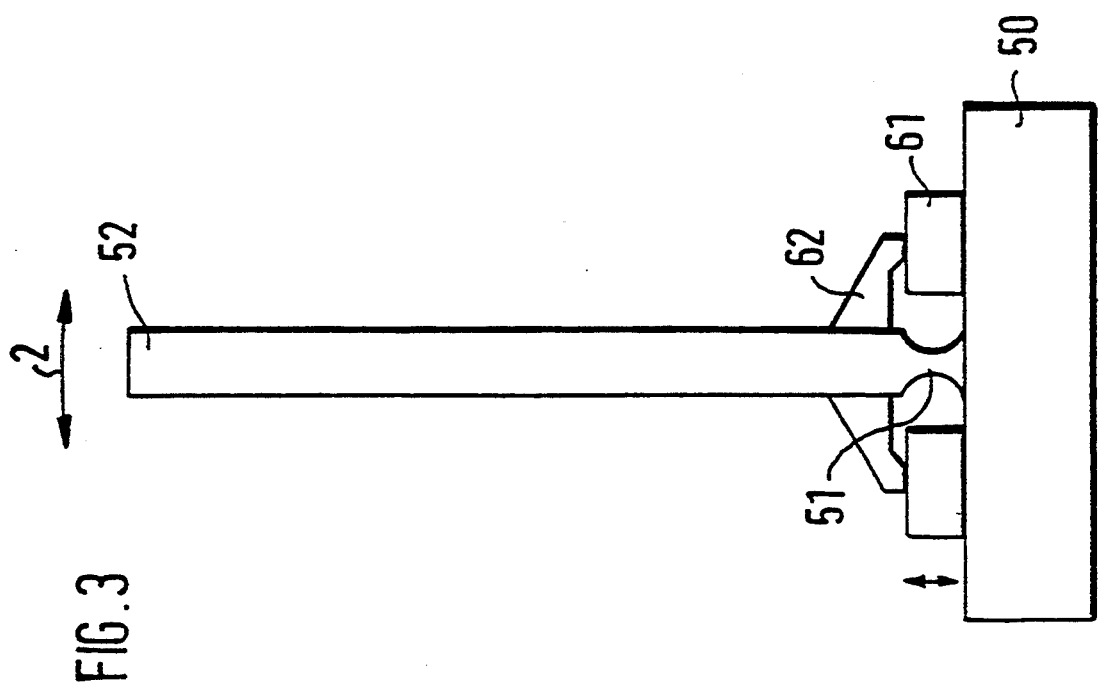

A closing element for a micro-mechanical rotary slide valve is illustrated in FIG. 3. It has a beam 52 which extends from a fixed pedestal 50. The beam 52 has been reduced in thickness in the area 51 of its base point, so that it preferably performs a movement around this area 51, which is indicated by the arrow 2. The beam is used to cover one or several through-openings in a first layer 25, which are not shown here. The mode of functioning of the microminiature valve also corresponds to the one shown in FIG. 1, only in this example the closing element does not perform a parallelogram-like lateral displacement, but instead a partial rotary movement around the base point of the beam 52. For actuating the closing element, piezo elements 61 are disposed on both sides of the pedestal 50 around the base point of the beam 52. The piezo elements 61 are connected via lever arms 62 with the beam 52, so that a change in extension of the piezo elements 61 results in a displacement of the beam 52. Depending on which piezo element is triggered or in which manner it is triggered, the beam 52 can be moved in the plane of the layer.

Figure 4:
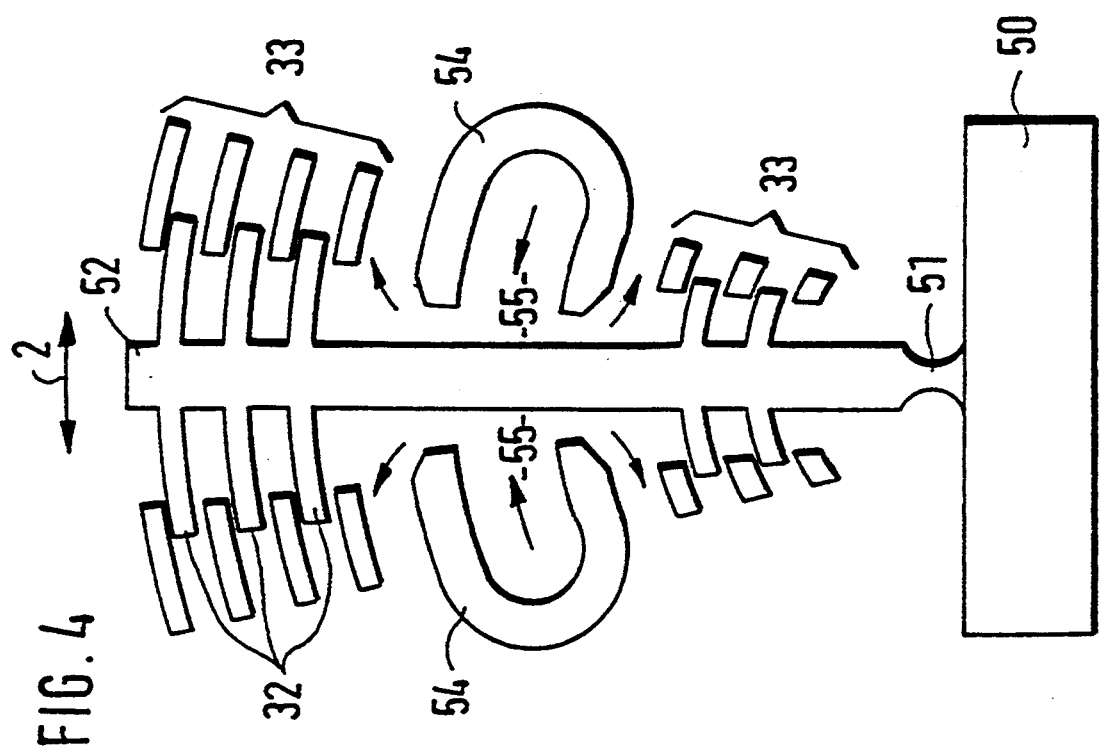

A further exemplary embodiment of a closing element for a rotary slide valve is shown in FIG. 4. As with the exemplary embodiment shown in FIG. 3, the closing element consists of a beam 52, which is connected on one side with a pedestal 50 via a base point and which is reduced in thickness in the area of the base point, so that the closing element can perform a partial rotary movement around the base point. In this case the drive for the displacement of the beam 52 takes place via an electrostatic finger drive formed by lamellas 32 extending from the beam 52 and lamellas 33 disposed opposite them. In the same way as in the exemplary embodiment shown in FIG. 1, the finger structures 32 and 33 are interspersed to a greater or lesser extent, depending on the voltage applied between the finger structures 32 and 33.

Respective nozzle-like edgings 54, each having nozzle openings 55 facing the beam 52, are disposed laterally of the beam 52 in a first layer of the microminiature valve structure, not shown here, in the area of the through-openings forming the inlet. The degree of opening of the nozzle openings 55 can be varied depending on the position of the beam 52, so that it is selectively possible to open or close one of the two nozzle openings 55 disposed to the right or left of the beam 52. With this microminiature valve the fluid flows through the inlet into the nozzle-like edgings 54 in the second layer 15 of the microminiature valve and is conducted outward through the nozzle openings 55 in accordance with the arrows in FIG. 4. The realization of this microminiature valve requires a top cover for the second layer 15.

The microminiature valve shown in FIG. 4 can just as well be driven by piezo elements, such as shown in FIG. 3.

We claim:

1. A microminiature valve in multi-layered structure for switching or controlling fluid flows (1), having
 an inlet element (20),
 a closing element (10), and
 electrically actuated means for displacing one of said elements laterally with respect to the other element,
 where the inlet is formed in a first layer (25) as at least a first through-opening (24) and the closing element (10) is structured out of a second layer (15), which is applied on the first layer (25),
 wherein
 the closing element is suspended on a beam (52) structured from said second layer (15);
 the second layer (15) defines at least a further through-opening (14) adjacent the closing element (10),
 the closing element (52) is displaceable essentially parallel to the first layer (25) and to the second layer (15), so that, in at least one first position of the closing element, the at least one through-opening (24) of the inlet, together with the at least one further through-opening in the second layer (15) defines at least one flow-through opening (14,24), and
 the cross section of the at least one flow-through opening changes upon actuation of the closing element (10); and
 wherein means are provided for pressing said closing element, in at least one position, against said first layer (25).

2. A microminiature valve in accordance with claim 1,
 characterized in that
 the beam (52) is connected at one end to a pedestal (50) and pivotable about a base point (51) adjacent the pedestal; and the width of the beam (52) is reduced in an area (51) near the base point.

3. A microminiature valve in accordance with claim 1,
 characterized by
 lamellas (33) extending from one or both sides of the beam (52).

4. A microminiature valve in accordance with claim 3,
 characterized in that
 the dimensions and disposition of the at least one first through-opening of the inlet and of the beam (52) and the lamellas (33) are selected such that the beam (52) and the lamellas (33) completely cover the at least one first through-opening of the inlet in at least one first position.

5. A microminiature valve in accordance with claim 3,
 characterized in that
 the dimensions and disposition of the at least one first through-opening of the inlet and of the lamellas (33) are selected such that the lamellas (33) completely cover the at least one first through-opening of the inlet in at least one first position.

6. A microminiature valve in accordance with claim 1,
 wherein said means for pressing said closing element against said first layer (25) comprises
 means for applying a voltage between portions of the first layer (25) and portions of the second layer (15).

7. A microminiature valve in accordance with claim 1,
 characterized in that
 the actuation of the closing element is performed piezo-electrically 8. A microminiature valve in accordance with claim 7,
 characterized in that
 the closing element is connected with at least one triggerable piezo element (61) via at least one lever arm (62), so that a change of extension of the at least one piezo element (61) causes a displacement of the closing element.

9. A microminiature valve in accordance with claim 7,
 characterized in that
 the at least one piezo element is constituted by a multilayer ceramic piezo piece.

10. A microminiature valve in accordance with claim 1,
 characterized in that
 the actuation of the closing element is performed electrostatically.

11. A microminiature valve in accordance with claim 10,
 characterized in that
 starting at the closing element, at least one first comb-shaped lamella structure (32) is formed in the second layer (15), at least a second comb-shaped lamella structure (33) is formed in the second layer (15) which is disposed such that the lamellas of the first lamella structure (32) and the lamellas of the second lamella structure (33) are interspersed, and means are provided for applying a voltage between the first lamella structure (32) and the second lamella structure (33).

12. A microminiature valve in accordance with claim 11,
 characterized in that
 the first lamella structure (32) and the second lamella structure (33) are embodied in the entire thickness of the second layer (15).

13. A microminiature valve in accordance with claim 1,
 characterized in that
 the first layer (25) and the second layer (15) are monocrystalline silicon wafers with a crystal orientation selected from the group consisting of (100)-crystalline orientation and (110)-crystalline orientation.

14. A microminiature valve in accordance with claim 20, characterized in that
 the first layer (25) and the second layer (15) are bonded to each other via an auxiliary layer (110) of silicon oxide.

15. A microminiature valve in accordance with claim 13, characterized in that the first layer (25) and the second layer (15) are structured by a process selected from the group consisting of anisotropic wet-chemical etching and electro-chemical dry etching.

16. A microminiature valve in accordance with claim 13,
characterized in that
the first layer (25) has, in the surface facing the second layer (15), at least one of: two pedestal-like raisings (104) or at least two recesses (103) and at least one pedestal-like raising (104) and at least one recess (103),
the second layer (15) has, in the surface facing the first layer (25), recesses (103) at those places where there are pedestal-like raisings (104) in the first layer (25), and has pedestal-like raisings (104) in those places where there are recesses (103) in the first layer (25), where the positions of the closing element and the inlet are aligned in respect to each other, and
the recesses (103) and the pedestal-like raisings are disposed on the non-movable parts of the microminiature valve.

17. A microminiature valve in accordance with claim 13,
characterized in that
the crystalline orientation of the silicon wafer forming the second layer diverges by a small loss angle from the (110) orientation, and
the second layer (15) is structured by anisotropic wet-chemical etching.

18. A microminiature valve in accordance with claim 17,
characterized in that
the closing element is connected via resilient beams (12) with the second layer (15), where the orientation of one of the main axes of inertia of the resilient beams (12) slightly deviates from the orientation of the surfaces of the second layer (15), so that during actuation the closing element is given a displacement perpendicularly to the second layer (15), besides the displacement parallel to the second layer (15).

19. A microminiature valve in accordance with claim 1, wherein said means for pressing said closing element against said first layer (25) comprises
a plurality of resilient beams having respective support axes whose resistance to flexing is least in a plane substantially parallel to the surface of said second layer, yet slightly deviating from parallel, whereby displacement of said closing element parallel to said first layer also causes slight displacement of said closing element perpendicular to said first layer.

20. A microminiature valve in accordance with claim 1,
wherein the inlet is formed as a first grid structure (20) with grid beams (23) and holes (24), and the closing element is formed as a second grid structure (10) with grid beams (13) and holes (14).

21. A microminiature valve in accordance with claim 20,
wherein the grid beams (23) of the first grid structure (20) and the grid beams (13) of the second grid structure (10) are disposed parallel to each other, and the closing element is displaceable parallel to the grid beams (13, 23).

22. A microminiature valve in accordance with claim 20,
wherein the first grid structure (20) and the second grid structure (10) have holes of the same size.

23. A microminiature valve in accordance with claim 20,
wherein the hole size and the width of the grid beams (23, 13) are selected such that the grid beams (13) of the second grid structure (10) completely cover the holes (24) of the first grid structure (20) in at least a second position of the closing element.

* * * * *